Nov. 7, 1933.  C. V. KOONS  1,933,630
CONTROL FOR ELECTRIC HOISTS
Filed May 7, 1931  4 Sheets-Sheet 1

Inventor:
Charles V. Koons
by his Attorneys
Howson & Howson

Nov. 7, 1933.          C. V. KOONS          1,933,630
CONTROL FOR ELECTRIC HOISTS
Filed May 7, 1931          4 Sheets-Sheet 3
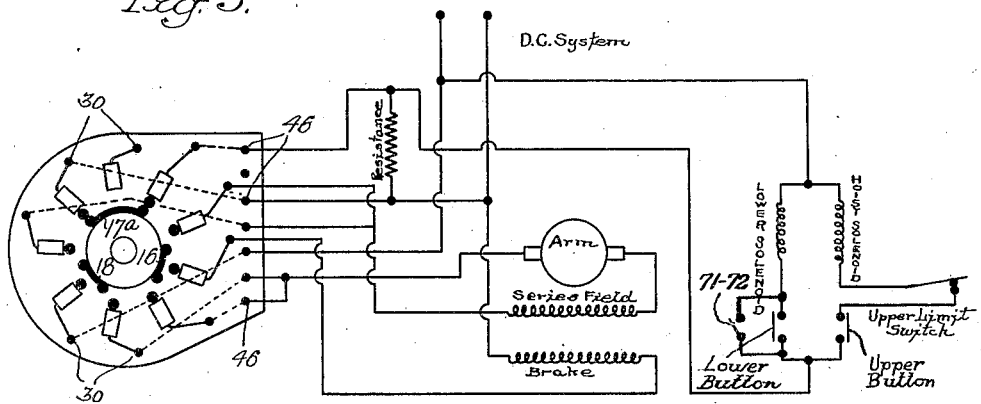
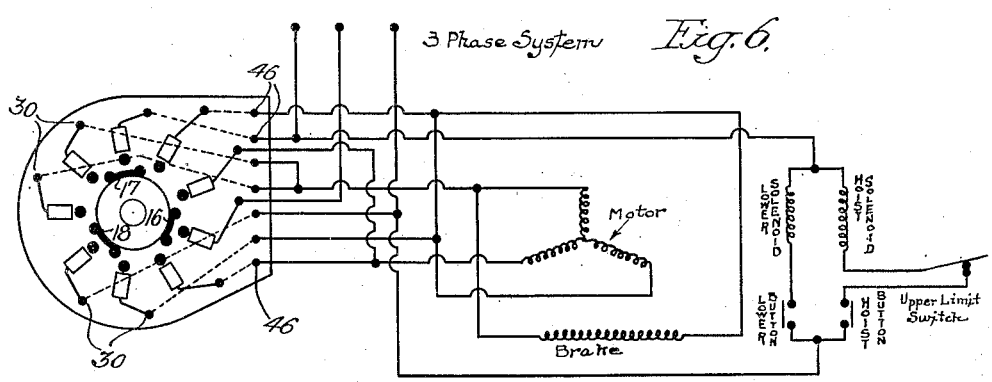
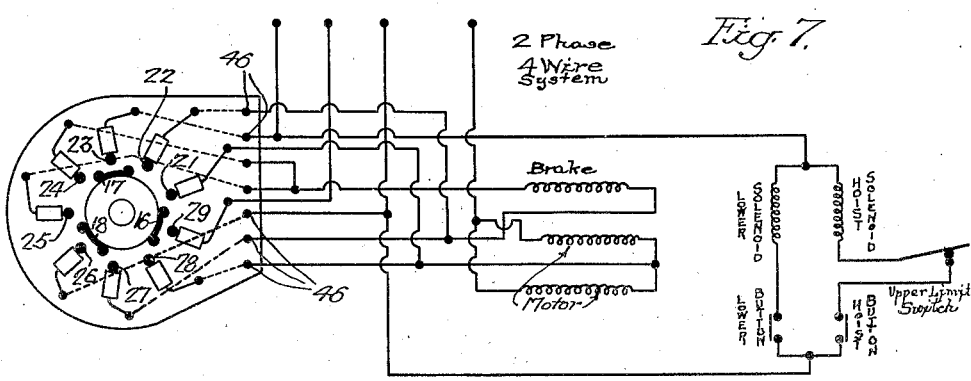

Nov. 7, 1933. C. V. KOONS 1,933,630
CONTROL FOR ELECTRIC HOISTS
Filed May 7, 1931 4 Sheets-Sheet 4
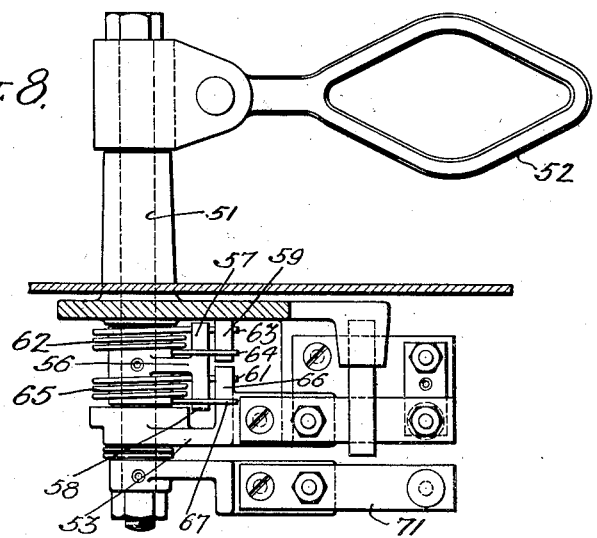
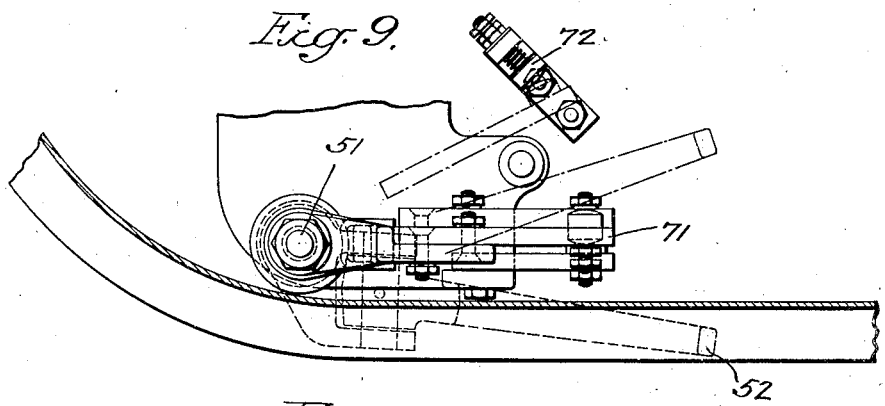
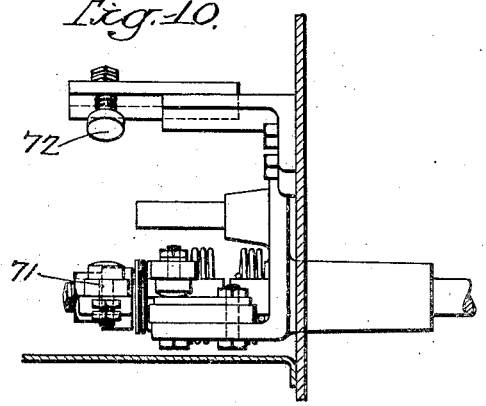

Patented Nov. 7, 1933

1,933,630

UNITED STATES PATENT OFFICE 1,933,630

CONTROL FOR ELECTRIC HOISTS

Charles V. Koons, Philadelphia, Pa., assignor to American Engineering Company, Philadelphia, Pa., a corporation of Pennsylvania Application May 7, 1931. Serial No. 535,706

6 Claims. (Cl. 172—152)

This invention relates to control mechanism for hoists, and has for its principal object the simplification and improvement of the control mechanism disclosed in the pending application of W. A. Hummel, Serial Number 364,240.

Another object of the invention is to provide a novel control of the stated character including means for preventing overtravel of the parts due to inertia of the actuating motor.

The invention also resides in certain novel and improved structural details and arrangements of parts hereinafter set forth and illustrated in the attached drawings, in which:

Figs. 5, 6 and 7 are typical wiring diagrams illustrating the mechanism as applied to direct current three-phase and two-phase four-wire systems, respectively;

Fig. 8 is a fragmentary sectional view similar to Fig. 4 illustrating a modification within the scope of the invention;

Fig. 9 is an end elevational view of the parts shown in Fig. 8;

Fig. 10 is an end elevational view of the parts shown in Fig. 8.

Figure 1:
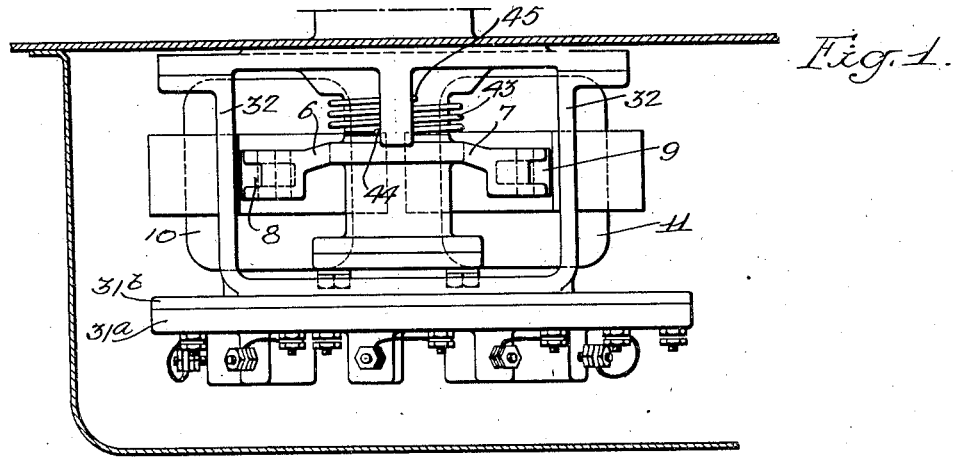
Figure 1 is a plan view of a control device made in accordance with my invention.
Figures 3, 4:
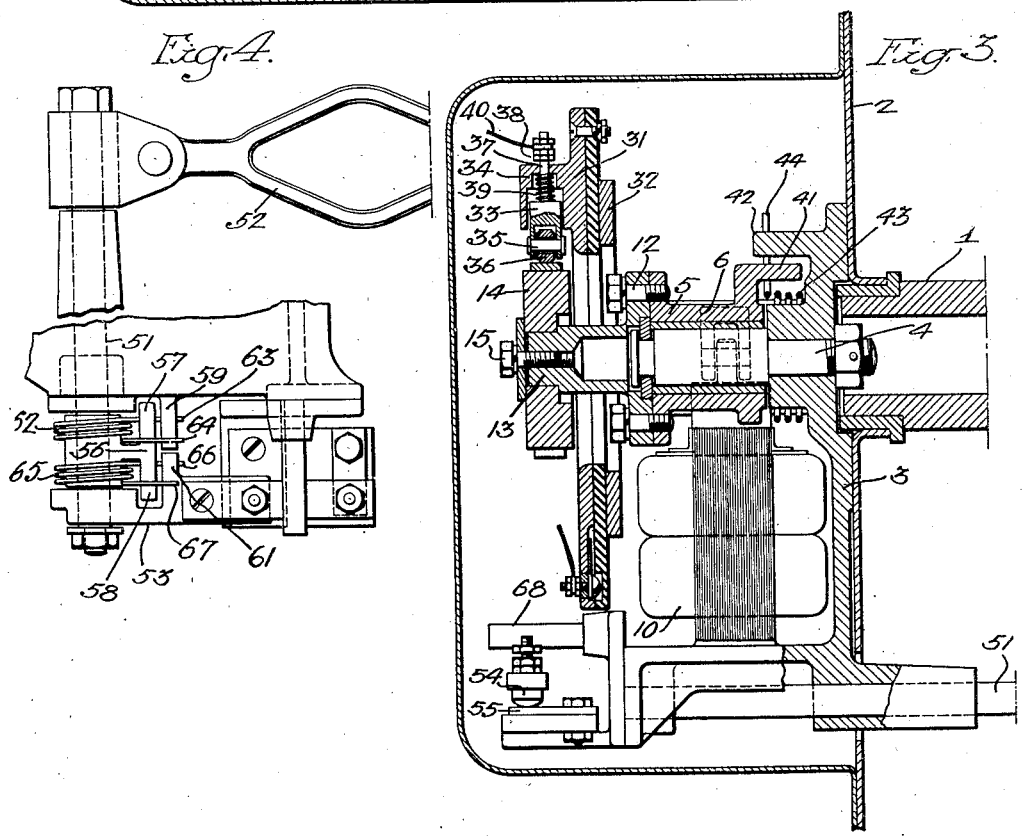
Fig. 3 is a section on the line 3—3, Fig. 2.
Fig. 4 is a fragmentary sectional view on the line 4—4, Fig. 2, showing in plan a detail of the mechanism.

With reference to the drawings, the numeral 1 indicates the drum shaft of a hoist incorporating my device, this shaft being operated by a suitable reversible electric motor not shown in the detail drawings but indicated in its relation to the control device in the accompanying wiring diagrams. Attached to the hoist housing 2 is a bracket 3 in which is secured a stud 4 constituting a journal for an oscillatory member 5. This member 5 as illustrated in Figs. 1 and 3 carries a pair of transverse and oppositely extending arms 6 and 7, to the extremities of which are pivotally connected depending plungers 8 and 9 respectively of a pair of solenoids 10 and 11, the latter being suitably supported upon the bracket 3. The arrangement is such that energization of either of the solenoids results in a depression of the associated arm, 6 or 7 as the case may be, and a corresponding oscillation of the member 5.

To the outer end of the member 5 is secured by means of bolts 12 an extension member 13 which carries a drum 14, this drum being detachably secured to the extension member 13 by means in the present instance of a bolt 15. The body of the drum 14 is of insulating material and carries at its periphery three sets or connected pairs of contact elements 16, 17 and 18. The drum 14 is concentrically arranged within an annular series of contact members 21, 22, 23, 24, 25, 26, 27, 28 and 29 mounted on an insulated support 31 carried by an extension 32 of the bracket 3, the contacts 16, 17, 18 and the contact members 21 to 29, inclusive, being coactive, as hereinafter set forth to control the operation of the hoist motor.

As illustrated in Fig. 3, the contact members 21 to 29, inclusive, comprise in each instance an element 33 slidably supported in a housing 34 projecting from the face of the support 31, the element 33 having journaled therein upon a pin 35 a wheel or roller 36 which is adapted to contact with one or other of the contact elements 16, 17 and 18 of the drum 14. A stem 37 extends from the element 33 radially outward through the extension 34 and is secured in said extension by means of a nut 38 on the outer threaded extremity thereof. A spring 39 confined between the inner end of the member 33 and the wall of the housing 34 tends to retain the member 33 in an extended position. Means is also provided on the outer end of the stem 37 for attaching thereto a wire 40 forming a part of the electrical system. Oscillation of the drum 14 as previously set forth by action of the solenoids 10 and 11 results in bringing the contact elements 16, 17 and 18 into engagement with certain of the contact members 21 to 29, inclusive, to thereby complete circuits of the electrical system including the hoist-actuating motor.

Figure 2:
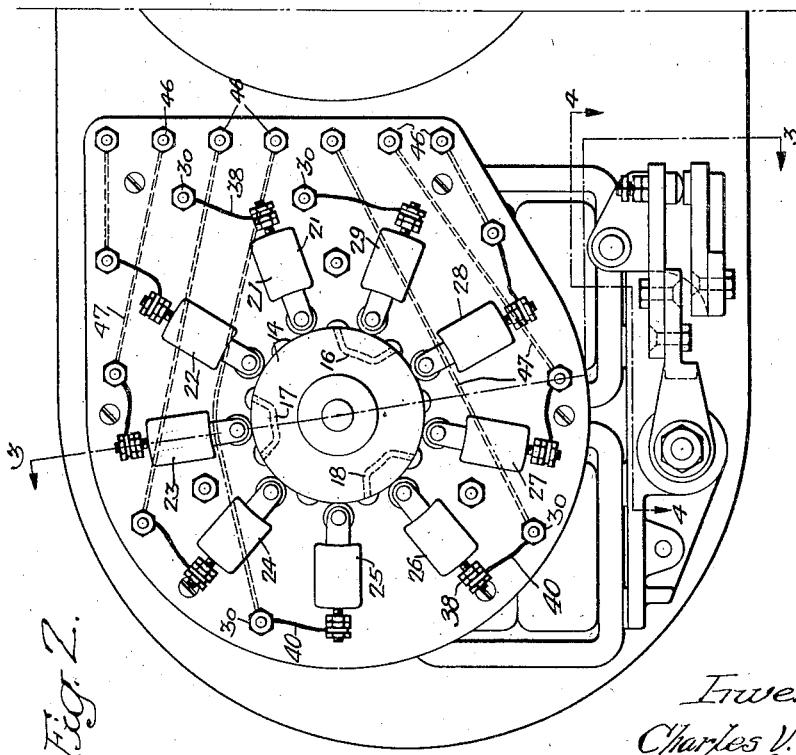
Fig. 2 is a front elevational view of the device.

As shown in Figs. 1 and 2, the support 31 comprises face and backing members, 31a and 31b respectively. From the facing member 31a project a series of terminal elements 30, to which are respectively attached the ends of connectors 40, and a second set of terminals 46 to which may be attached the wires of the external system embracing the hoist motor. Wires 47 form connection between the terminals 46 and the respective terminals 30, and these wires are concealed in the present instance between the face and backing members 31a and 31b of the support 31.

The member 5 has an extending arm 41 which directly underlies an oppositely projecting arm 42 on the bracket 3, and a coiled spring 43 supported on the said bracket has outwardly extending ends 44 and 45 which respectively engage opposite sides of both the arms 41 and 42, misalignment of the arms in either direction thereby being opposed by the tension of the spring 43, which accordingly acts to retain the member 5 resiliently in a predetermined neutral position in which the various contact elements occupy the relative positions shown in Fig. 2.

Journaled in the lower part of the bracket 3 is a shaft 51 which parallels the drum shaft 1. At its inner end this shaft 51 carries a lever 52 which is arranged in position to be engaged by the hoist hook or corresponding part when the hook approaches the upper limit of its travel. The opposite end of the shaft carries an arm 53 having at its outer end a contact member 54 which constitutes one element of an electric switch including as the other element a contact member 55 suitably supported on and insulated from the supporting bracket 3. The arm 53 is loosely mounted on the shaft 51, and also carried by the shaft and fixed thereto is an arm 56 having transverse extensions 57 and 58. Outwardly of the extension 57 is a projecting arm 59 of the bracket support, and the lever 53 has an arm 61 similarly located with respect to the extension 58. A spring 62 mounted on the hub of the lever arm 56 has projecting extremities 63 and 64 which respectively engage opposite sides both of the extension 57 and the arm 59, while a second spring 65 also mounted on the hub of the lever 56 engages with its extremities 66 and 67 the opposite sides of both the extensions 58 and 61. The spring 62 accordingly acts to resiliently maintain the outer end of the lever 56 in alignment with the arm 59, while the spring 65 performs a corresponding function with respect to the lever 56 and the lever 53. Oscillation of the shaft 51 by the means previously described is opposed by the spring 62, and the spring 65 tends to move the arm 53 with the lever 56 and through a corresponding angle. In the normal position of the arm 53 the contact elements 54 and 55 are in engagement as illustrated in Fig. 3, but when the hoist hook in its upward travel engages the arm 52 as previously set forth, the resultant rotation of the shaft 51 acting through the lever 56 and spring 65 elevates the lever 53 and with it the contact 54, thus opening the switch 54—55 and breaking the associated circuit.

The operation of the device may be understood by reference to the diagrammatic views of Figs. 6 and 7. As therein illustrated, alternative switches, designated respectively "lower button" and "hoist button", are provided which control flow of current individually to the solenoids 10 and 11. Pressure on the hoist button energizing the associated or hoist solenoid results in an oscillation of the drum 14 from the illustrated or neutral position into a position bringing the contacts 16, 17 and 18 into engagement with the appropriate contact elements of the series 21 to 29 to effect a release of the motor brake and a rotation of the motor in a direction winding in the hoist cable. Actuation of the motor continues until the said button is released or until the hoist hook or corresponding part engages the lever 52. At this point, the switch 54—55, designated "upper limit switch" in the diagrams, is opened, with the result that the "hoist solenoid" is deenergized, whereupon the self-centering spring 43 acts to return the member 55 and the control drum 14 to the original neutral position, thereby breaking all of the circuits and interrupting operation of the motor. Subsequent pressure on the "lower button" results in an energization of the "lower solenoid" and oscillation of the control drum in the opposite direction, making with the contact members 21 to 29, inclusive, the appropriate connections providing for actuation of the motor in an opposite direction, thereby unwinding the hoist cable from its drum. Downward movement of the cable releases the lever 52 and permits the spring 62 to return the arm 56 and with it the shaft 51 to the normal position and also carrying the switch arm 53 into the depressed position in which the switch element 54 contacts with the element 55. Closing of this switch, however, has no effect upon the motor in view of the fact that the switch designated "hoist button" is now open. An arm 68 limits the upward movement of the switch arm 53, and any inequality of movement between the lever 56 and the arm 53 is compensated by the flexible connection between these parts through the spring 65. Subsequent opening of the switch actuated by the "lower button" results in an immediate return by the spring 43 of the control drum 14 to the neutral position and a cessation of the operation of the hoist.

Operation of the device is in all essential respects the same with the electrical systems shown in Figs. 5 and 6, it being noted that the contact element 17a of the system shown in Fig. 5 differs in form but not in function from the corresponding element 17 of the systems of Figs. 5 and 6, in order to effect the appropriate connections between the contacts of the series numbered 21 to 29.

In Figs. 8 to 10, inclusive, I have illustrated a device which in all essential respects is similar to that previously described with the addition of an arm 71 which is fixed to the outer end of the shaft 51. This arm 71 is elevated with the arm 53 when the shaft 51 is rotated as previously described. If, however, the motor by reason of armature inertia drifts beyond a predetermined point following deenergization, the arm 71 is brought into engagement with a spring-pressed contact element 72 on the housing which effects the closing of an electric circuit, causing a reenergization and actuation of the motor in the opposite direction. The immediate effect of this reversal in the motor is to relieve the arm 52 to an extent permitting the spring 62 to carry the arm 71 clear of the contact 72, which again deenergizes the motor and brings the mechanism to a stop.

I claim:

1. In a hoist, the combination with a reversible electric motor, of switch means controlling operation of the motor in both directions, resilient means normally retaining said switch in a neutral or open position, a pair of solenoids operative respectively to actuate the switch mechanism to effect operation of the motor in the opposite directions, manually actuated switches for controlling energization of the respective solenoids, and an auxiliary switch controlling energization of one of said solenoids, said auxiliary switch being normally closed, mechanism operative following a predetermined operation of said motor for opening said auxiliary switch to deenergize the associated solenoid to thereby permit the resilient means to return the motor switch to the neutral position, and a normally open auxiliary switch associated with the other of said solenoids and adapted to be closed by a predetermined overtravel of the motor due to drift to energize the associated solenoid to effect a re-actuation of the motor in reverse direction.

2. In a hoist, the combination with a reversible electric motor, of a switch adapted in different positions to actuate the motor in opposite directions, resilient means normally retaining said switch in a neutral or open position, a pair of solenoids for moving the switch into the alternative motor-actuating positions respectively, manually-actuated switches for controlling energization of the solenoids, and an auxiliary switch for each solenoid arranged in series with said manually-actuated switches respectively, one of said auxiliary switches being normally closed and the other normally open, and means actuated by predetermined operation of the motor in one direction for successively opening said normally closed auxiliary switch and for closing said normally open auxiliary switch to thereby interrupt actuation of the motor and subsequently to effect a re-actuation of the motor in the opposite direction.

3. In a hoist, the combination with a reversible electric motor, of means for controlling operation of said motor including a normally closed switch adapted when open to interrupt operation of the motor in one direction, and a normally open switch adapted when closed to effect actuation of the motor in the opposite direction, a motor-actuated element, and means whereby said element by predetermined movement in one direction opens said normally closed switch and subsequently closes the normally open switch.

4. In a hoist, the combination with a reversible electric motor, of a switch adapted in alternative positions to actuate the motor in opposite directions, resilient means normally moving said switch into a neutral or open position interrupting operation of the motor in both directions, a pair of solenoids operative respectively to move the motor switch into the alternative operative positions, and a pair of switches for respectively controlling energization of said solenoids, one of said switches being normally closed and the other normally open, mechanism operative by a predetermined actuation of the motor to open the normally closed switch to thereby interrupt motor operation and to permit said resilient means to return the motor switch to the neutral position, and means operative by a predetermined drift of the motor following said interruption to close said normally open switch to thereby energize the associated solenoid to effect a reactuation of the motor in reverse direction.

5. In a hoist, the combination with a reversible electric motor, of a switch adapted in alternative positions to actuate the motor in opposite directions, resilient means normally moving said switch into a neutral or open position interrupting operation of the motor in both directions, a pair of solenoids operative respectively to move the motor switch into the alternative operative positions, and a pair of switches for controlling energization of said solenoids respectively, one of said switches being normally closed and the other normally open, mechanism operative by a predetermined actuation of the motor to open the normally closed switch to thereby interrupt motor operation and to permit said resilient means to return the motor to the neutral position, and means operative by a predetermined drift of the motor following said interruption to close said normally open switch to thereby energize the associated solenoid to effect a reversal of the motor operation, and resilient means for subsequently re-opening said normally open switch to again effect an interruption in the operation of said motor.

6. In a device of the character described, the combination with a reversible electric motor, switch means for controlling the direction of rotation of said motor, automatic means for interrupting the operation of said motor comprising, a normally closed switch, a rock shaft, and means provided on said rock shaft for operating said switch to open position, resilient means for rocking said shaft to effect closing of said switch, and to retain said switch in closed position, additional switch means for effecting a reverse operation of said motor, and means mounted on said rock shaft to effect closing of said last mentioned switch.

CHARLES V. KOONS.